US008640393B2

(12) United States Patent
Claerhout et al.

(10) Patent No.: US 8,640,393 B2
(45) Date of Patent: Feb. 4, 2014

(54) DEFORMABLE SLAT SYSTEM

(75) Inventors: Xaveer Claerhout, Sijsele-Damme (BE); Barbara Van Biervliet, Sijsele-Damme (BE)

(73) Assignee: BVBA Claerhout — Van Biervliet, Sijsele-Damme (BE)

( * ) Notice: Subject to any disclaimer, the term of this patent is extended or adjusted under 35 U.S.C. 154(b) by 57 days.

(21) Appl. No.: 12/921,819

(22) PCT Filed: Mar. 12, 2009

(86) PCT No.: PCT/IB2009/000496
§ 371 (c)(1), (2), (4) Date: Sep. 10, 2010

(87) PCT Pub. No.: WO2009/112933
PCT Pub. Date: Sep. 17, 2009

(65) Prior Publication Data
US 2011/0011009 A1   Jan. 20, 2011

(30) Foreign Application Priority Data

Mar. 12, 2008  (BE) .................................. 2008/0154

(51) Int. Cl.
*E06B 9/00* (2006.01)
(52) U.S. Cl.
USPC .................... 52/71; 52/235; 52/222; 160/218
(58) Field of Classification Search
USPC ................ 52/173.3, 235, 64, 71, 74, 75, 245, 52/80.1, 222, 202; 160/218, 351, 352
See application file for complete search history.

(56) References Cited

U.S. PATENT DOCUMENTS

| | | | |
|---|---|---|---|
| 2,142,547 A | 1/1939 | Anderson | |
| 3,407,546 A | 10/1968 | Yates | |
| 3,902,753 A * | 9/1975 | Wilson | 297/185 |
| 4,030,219 A * | 6/1977 | Donovan | 40/605 |
| 4,050,204 A * | 9/1977 | Scott | 52/262 |
| 4,094,108 A | 6/1978 | Scott | |
| 4,375,829 A * | 3/1983 | Dorr et al. | 160/135 |
| 5,287,909 A * | 2/1994 | King et al. | 160/135 |
| 5,373,863 A * | 12/1994 | Prizio | 135/97 |
| 5,515,900 A * | 5/1996 | West et al. | 160/135 |
| 5,595,233 A * | 1/1997 | Gower | 160/232 |
| 5,673,827 A * | 10/1997 | Lamberti | 223/120 |
| D422,797 S * | 4/2000 | Vincent | D6/332 |
| 2012/0000143 A1 * | 1/2012 | Stackenwalt et al. | 52/83 |

* cited by examiner

*Primary Examiner* — Brent W Herring
(74) *Attorney, Agent, or Firm* — Symbus Law Group LLC; Clifford D. Hyra

(57) ABSTRACT

A deformable slat system for a building construction has one or more deformable slats(1). At least one of the aforementioned slats (1) has two slat parts (Ia, Ib) which are joined together in such a way that they are hingeable about a hinge line (2). This slat (1) is bendable and/or twistable in each first position where the slat parts (Ia, Ib) are hinged at a straight angle or a zero angle with respect to one another and is rigidified in each second position where the slat parts (Ia, Ib) are hinged at an angle differing from the straight angle or zero angle with respect to one another. The slat system includes means (13a, 13b, 19a, 19b, 14, 15, 16) for bringing the aforementioned slat (1) selectively into a first or a second position, and for bringing a slat (1), which has been brought into a first position, into a bent and/or twisted position. Furthermore, a slat (1) is provided for a slat system of this type, and also a building construction is provided with a slat system of this type.

19 Claims, 13 Drawing Sheets

FIG. 3a          FIG. 3b

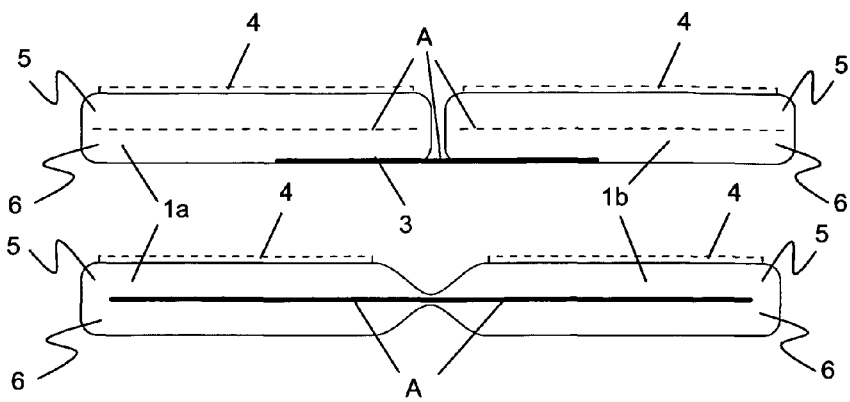
FIG. 4a
FIG. 4b
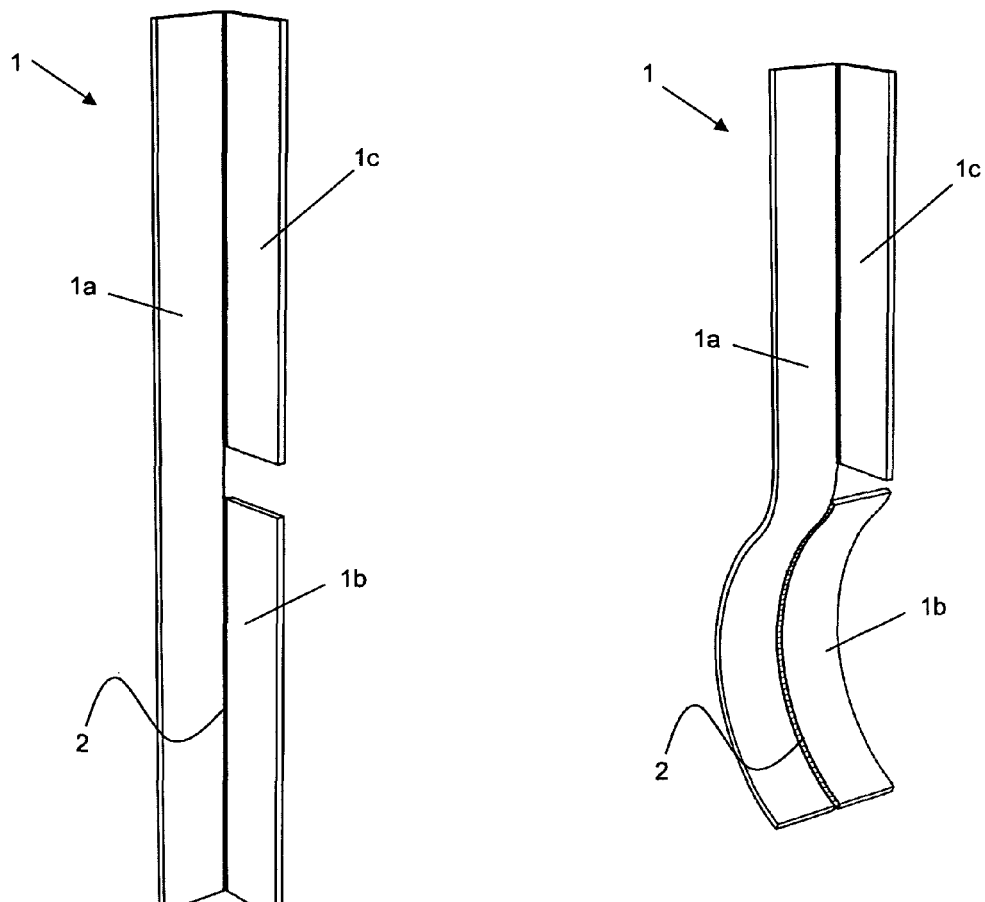
FIG. 5a
FIG. 5b

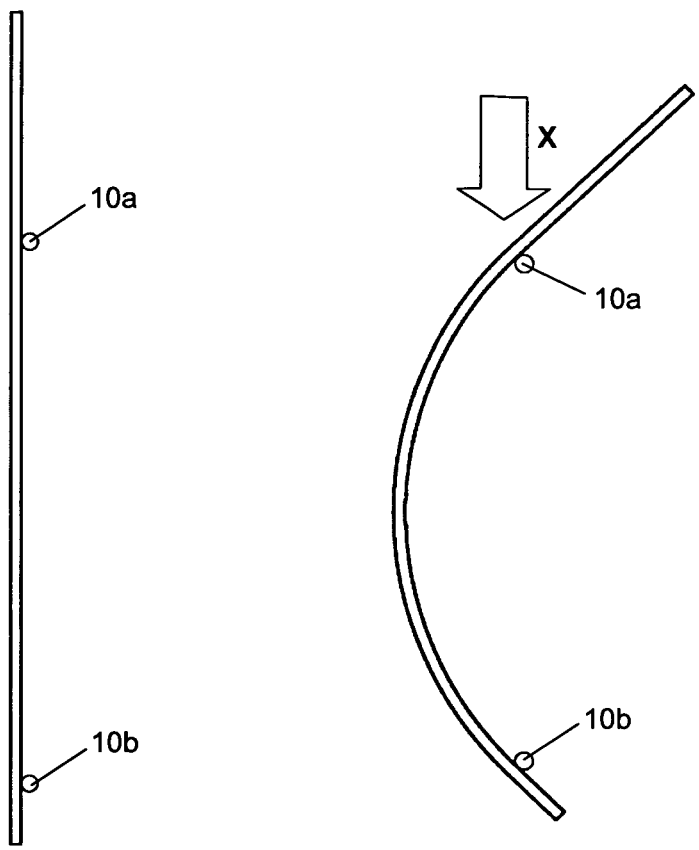
FIG. 8a    FIG. 8b

DEFORMABLE SLAT SYSTEM

This application claims the benefit of Belgian patent application No. 2008/0154, filed Mar. 12, 2008, which is hereby incorporated by reference in its entirety.

BACKGROUND

From the genesis of modernism at the start of the 20th century to the present day, one of the main concerns in the designing of buildings is that a maximum amount of natural light is admitted. From fairly conventional structural inner cores in concrete and steel—which are constructed from the bottom up—to the more complex variants, these constructions allow in buildings maximum glazing of the facades via the overhang principle. The rapid development of the curtain wall and associated glass technology is obviously a logical consequence of this. To this day, there is huge demand in construction for ever larger glass surfaces in ever more complex forms and assemblies.

The problem of the format of the—assembled or non-assembled—glass parts to be used is of course linked to, inter alia, the problem of the wind load to be accommodated and the energy permeability of the glass. Despite the multiplicity of high-technological glass assembly solutions, the placing of a manipulable external sun protection system at the level of the facades on which the sun shines remains to this day the most efficient manner to correctly control the irradiation heat in order thus to prevent the greenhouse effect indoors.

Nowadays, energy-saving building is highly topical. More than ever before, architects and consultants have been found to be convinced that an excessive amount of energy, which still enters via glass panels oriented toward the sun, may no longer be cooled via cooling systems which waste energy. The development of the external sun protection systems would appear partly to allow for this defect. The sun protection systems on offer are becoming more and more diverse in type and form and are at the same time becoming more manipulable.

Most of what is commercially available and, in other words, is also used is in the form of vertical or horizontal awning systems, blinds and curtains consisting of slats and which are deformable in their entirety. Wall entities of this type are deformed by the pivoting or tilting, manually or by means of an actuator, of these slats which are mounted in a frame or a shutter. This is carried out in all cases using intermediate hinge points and guide rails.

There are also moving systems which are already automated, wherein parts of walls and/or roofs can be opened or closed. Intermediate hinges, pivots and guide rails allow complex forms to be generated during the movement of these components.

Thus, for example, the Expanding Retreat House project, which was developed within the context of Smart Geometry—Workshop & Conference, New York, January 2007, comprises a system of mechanical blinds which serve in their closed position as a secondary weather and fire casing and which are folded up in their open position to form sun protection for the windows. The blinds are pushed up or down (using a jack or hydraulically) by means of a force. Depending on the location of the buckling point (or hinge point), a specific deformation of the blind will occur. The starting point of one blind and its buckling point can differ from those of an adjacent blind, as a result of which a specific aesthetic effect is obtained.

However, the drawback of this system is that it is limited in its manipulability, since the blinds can be moved merely in one way, namely at the level of the buckling or hinge point of the blind.

WO 2007/093285 discloses a deformable free-standing wall system which is provided with a light central core system sandwiched between two outermost lining plates. Parallel incisions over the complete height on one or on both sides of the wall allow the wall entity to curve and to be made to stand fairly upright. The wall can thus be completely rolled up in order to be transported and subsequently erected in accordance with a specific curve.

Also known is a wall system consisting of a number of small plates which, activated by a large number of actuators, are movable, referred to as the Aegis Hyposurface. The movement of these plates is activated by the deformation of a rear intermediate piece which connects the triangular plates at the corners, and which in this way allows the plates to move and/or hinge separately from one another. This wall system combines information technology with a physical variable appearance. The screen is said to be dynamic. A large number of patterns and shapes in the wall system is possible. However, the system remains primarily a design approach, since it strives for an aesthetic view which otherwise solves next to no problem of building physics.

The article "The development of the flexible louver" by BUNA, T. (Martin Marietta Aerospace, Denver, Colo.) describes the use of flexible blinds as a thermal control instrument. This system was developed from space travel. The slats can be activated, placed in a convex or concave manner, by one or more actuators. As a result of the specific manner of reflection, radiation can no longer enter as would be the case in conventional blinds. In this case, the slat system forms part of a micro-technological entity suitable for space travel. However, this system is completely inappropriate for building applications on earth.

SUMMARY

The invention relates on the one hand to a deformable slat system for a building construction, comprising one or more deformable slats, and on the other hand also to a deformable slat which is suitable for a deformable slat system of this type. Furthermore, this invention also relates to a building construction comprising a deformable slat system of this.

The object of the invention is accordingly to provide a slat system, and a slat provided with a slat system of this type, which, in buildings and in the overhang variants of the slat system such as specific types of garden installation elements, awnings and parasols, garden pavilions, etc., makes basic physical elements such as light, heat, ventilation and/or energy controllable to a specific degree.

This object is achieved by providing a deformable slat system for a building construction, comprising one or more deformable slats, wherein according to this invention, at least one of these slats comprises two slat parts which are joined together in such a way that they are hingeable about a hinge line, this slat is bendable and/or twistable in each first position wherein the slat parts are hinged at a straight angle or a zero angle with respect to one another, and is rigidified in each second position wherein the slat parts are hinged at an angle differing from the straight angle or zero angle with respect to one another, and the slat system furthermore also comprises means for bringing the aforementioned slat selectively into a first or a second position, and for bringing a slat, which has been brought into a first position, into a bent and/or twisted position.

A slat system of this type makes basic physical elements such as light, heat, ventilation and/or energy controllable to a specific degree in various applications.

An additional, not insignificant advantage is the fact that a slat system of this type, when used in buildings, can function as a flexible skin structure for both internal and external spaces. This flexible skin structure can be altered as a function of the time of day and the season. This flexible skin structure will impart a defining character to the architectural expression (or the outer appearance) of the entity to which a slat system of this type is applied. After all, the slats of the slat system can be conceived of in a very broad range of ways and be combined with fixed, permanently rigidified or deformed parts. In addition, the slats can, via the bending and/or twisting, clear specific rear glass surfaces, required apertures or openings. This will define above all the facade view but also the perception from the interior outward.

Deformable slats of this type also allow a very polyvalent additional construction layer to be formed in external facade application. The rigidification of the slats of the slat system can close off the facade and make it weather- and wind-resistant.

In a preferred embodiment of the slat system according to the invention, the aforementioned means comprise displacement means which are provided to bring one or more deformable slats, selectively, to a first or a second position and to bring at least one slat, which has been brought into a first position, selectively, into a desired bent and/or twisted position.

Preferably, these displacement means comprise at least one actuator to bring one or more deformable slats automatically into a rigidified or a bent or a twisted position.

A slat system of this type is not only very diverse in its possible applications but is in addition also particularly user-friendly and allows control from automated and programmable control systems.

The one or more actuators can inter alia be selected from thermal actuators, pneumatic actuators, hydraulic actuators, three-dimensional actuators, electric motors, stepping motors, piezoelectric translators or linear actuators. Other types of actuators can also be used. These are preferably activated by the necessary software.

Steel cables and other strengthening and transfer components, optionally activated by relatively large hydraulic systems, can also be applied for bending, twisting and rigidifying the aforementioned slats.

In a preferred embodiment of a deformable slat system according to the invention, at least one of the deformable slats comprises two slat parts which are hingeably joined together at one side over their entire length.

In a second preferred embodiment of a deformable slat system according to the invention, at least one of the deformable slats comprises a first slat part which is hingeably connected to a second slat part only over a portion of its length. This connection is of course also such that the hinge parts are hingeable about a hinge line.

In this case, the aforementioned first slat part can be connected over another portion of its length to a third slat part, whereas the first and the third slat part are connected in a fixed position with respect to one another and form a permanently rigidified and/or deformed portion of the deformable slat.

In a slat of this type, one part of the slat can be selectively brought into a rigidified, bent or twisted position, whereas another part of the slat continues to maintain its original shape. In slats of this type, the permanently rigidified and/or deformed portion can perform a specific function (for example be used as a parapet), whereas the other portion, which can be brought selectively into a rigidified, bent or twisted position, can perform a different function. However, both parts nevertheless form one consistent and logical entity.

In an advantageous embodiment of a deformable slat system according to the invention, at least one of the deformable slats is constructed on the basis of the vertebral column principle and can be rigidified in a bent position.

Slats of this type can be rigidified in two different positions, namely the abovementioned second position, wherein the slat parts are hinged at an angle differing from the straight angle or zero angle with respect to one another, and a bent position.

The rigidifying in the bent position is possible for example by fixing neighboring vertebral column pieces of the slat with respect to one another while the slat is in its bent position. This bent position is obtained by bending the slat from the abovementioned first position wherein the slat parts are hinged at a straight angle or a zero angle with respect to one another.

In this case, one slat part of the aforementioned slat is provided on one side with a number of conical pieces of which at least two neighboring pieces are provided with means for being joined together in a bent position of the slat part, so that the slat is rigidified in this bent position.

The aforementioned slats are provided, for example on the rear, with conical pieces which are provided to be interconnected by means of interacting parts in accordance with the peg-hole principle.

The other slat part of the aforementioned slat can be provided on the same side with one or more nipples made of a deformable material, which are located in a respective space between two neighboring conical pieces when the aforementioned slat parts are placed in an angle-forming position.

These nipples are then rotated in the open spaces between the conical pieces, and help to strengthen the rigidified position of the slat.

One or more slats can be provided with recesses, profilings and/or internal channels.

Thus, a slat according to this invention can be provided with perforations through which they can let through a specific amount of light or sun. The perforations can be directed perpendicularly to the surface of the slat, but can also be formed with any other orientation. Preferably, the orientation is expediently defined as a function of the angle of incidence of the (sun)light, wherein it is desirable to let through as much of this light as possible. As the orientation of the perforations also changes in accordance with the position of the slat parts, the letting-through of light will also be dependent on the position of the slat (the first or second position). Bending and/or twisting of the slat will also change the orientation of the perforations so that the letting-through of light can also be influenced by bringing the slat into a more or less bent and/or twisted position.

The recesses, profilings and/or internal channels can in this case be provided with
  reinforcement parts;
  PCMs (phase change materials);
  rigidifiable composites;
  heat collector pipes;
  cables and/or pipes.

Furthermore, the slat system can also comprise one or more slats which are provided with one or more flexible photovoltaic solar cells, light foils and/or flexible data screens.

One or more slats of the slat system can also be provided on their outer surface with texture, patterns and/or prints.

The slat system can comprise one or more slats around which a flexible casing is provided, so that a different shaping effect is obtained, since the slat parts are no longer visible. This casing can be made, at the side edges thereof, of a soft plastics material so that the slats become for example finger-safe.

In a particular embodiment of a slat system according to the invention, a plurality of slats can be provided to be placed next to one another in a rectilinear arrangement. In another particular embodiment, the slats can be provided to be placed next to one another in a circular arrangement.

One or more slats can be held at one or both ends in the slat system.

Thus, one or more slats can be provided to be held at one or both ends, at the level of the location where the slat parts are arranged so as to be hingeable with respect to one another, at a fixed location in the slat system.

At least one slat can be held in the slat system as a result of the fact that each slat part is connected to a respective slidable slat, so that the slat can be brought selectively into a first or a second position as a result of the sliding of at least one of the aforementioned slats.

These slats can for example be received in respective guide profiles so as to be able to slide in their longitudinal direction.

The aforementioned slats are preferably also displaceable in the longitudinal direction of the slat in order to bring this slat into a bent position.

In another preferred embodiment, one or more floating points can be provided in interaction with at least one of the deformable slats to influence the bending curve during the bending of the slat.

A floating point of this type is for example a fixedly arranged element which is arranged within the bending range of the slat so that the slat abuts during the bending against the element, as a result of which further bending of the slat is locally impeded by the element, and the bending curve of the slat differs from the normal bending curve in the event of unimpeded bending. It is thus possible to ensure, by providing or not providing one or more floating points, that a slat can assume two or more different bending curves.

The deformable slats are preferably made of an elastically deformable polymer material, an elastically deformable composite, an elastically deformable metal or a combination of an elastically deformable composite and elastically deformable metal.

The slat system according to this invention comprises preferably a plurality of deformable slats which are arranged next to one another and jointly form a wall or building element which is provided to be integrated into a building construction.

This invention also relates to a deformable slat which is suitable for a deformable slat system according to this invention. A deformable slat of this type preferably also has one or more of the above-indicated particular or preferred properties.

The above-indicated object of the invention is of course also achieved by providing a building construction comprising a deformable slat system according to this invention.

In order further to illustrate the properties of this invention and in order to indicate additional advantages and special features thereof, there follows now a more detailed description of a deformable slat system according to the invention and certain exemplary embodiments and examples of application thereof. It will be clear that nothing in the subsequent description may be interpreted as a restriction of the protection requested in the claims for this invention.

BRIEF DESCRIPTION OF THE DRAWINGS

Furthermore, some of these embodiments are illustrated in the appended figures, wherein reference numerals refer to these figures, in which:

FIGS. 3a, 3b and 3c are a perspective view of a third possibility of a rigidified position, an intermediate position and a deformed position of a slat of a slat system according to the invention;

FIG. 4a is a cross section of a first embodiment of a slat of a slat system according to the invention;

FIG. 4b is a cross section of a second embodiment of a slat of a slat system according to the invention;

FIGS. 5a and 5b are a perspective view of the rigidified and a deformed position of a third embodiment of a slat of a slat system according to the invention;

FIG. 8a is a cross section of a slat of a slat system according to the invention which is arranged with respect to two hinge points and which is located in the intermediate position;

FIG. 8b is a cross section of the slat as shown in FIG. 8a in a bent position;

FIG. 9c is a perspective rear view of FIG. 9a;

DETAILED DESCRIPTION

Figure 1A:
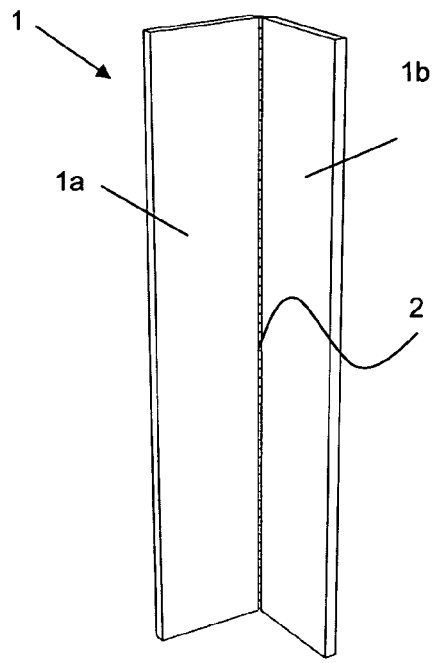
FIGS. 1a, 1b, 1c and 1d are a perspective view of a first possibility of a rigidified position, an intermediate position and a deformed position (bent and twisted) of a slat of a slat system according to the invention.

A deformable slat system according to the invention comprises a large number of elastically deformable slats (1). The term "elastically deformable" means "returning at all times to the original shape".

These slats (1) comprise, as shown in FIGS. 1a to 3c inclusive, and FIGS. 5a and 5b, 7a to 7f inclusive and 9a to 9d inclusive, two elastically deformable slat parts (1a, 1b) which are joined together along a line, and not at a point, and are hingeable with respect to one another (=rotatable toward one another and away from one another) around this line (2) (referred to in the remainder of the text of the description also as the hinge line (2) or hinge (2)).

As is shown in FIGS. 1a to 3c inclusive, 7a to 7f inclusive and 9a to 9d inclusive, the slat (1) can in this case be constructed from two slat parts (1a, 1b) which are hingeably joined together at one side thereof over their entire length.

It is however also possible to construct, as shown in FIGS. 5a and 5b, the slat (1) from two slat parts (1a, 1b), the first slat part (1b) being hingeably connected to the first slat part (1a) at one side thereof merely over a specific section of its length. In addition, the slat (1) can, as is shown in FIGS. 5a and 5b, also be provided with a third slat part (1c) which is securely connected to the first slat part (1a), in this case at an angle of 90°, and which can be permanently rigidified or permanently deformed.

If the aforementioned slat parts (1a, 1b) are hinged at a straight angle (=an angle of) 180° (see FIGS. 1b, 7b, 7d and 9c) or a zero angle (=an angle of 0°) (see FIG. 3b) with respect to one another, the entire slat (1) (see FIGS. 1c, 1d, 2b, 3c, 7c, 7f, 9b and 9d) or a portion of the slat (1) (see FIG. 5b) becomes bendable and/or twistable.

If the aforementioned slat parts (1a, 1b) are located at an angle with respect to one another which differs from the straight angle or the zero angle, then the entire slat (1) or a portion thereof is rigidified (see FIGS. 1a, 2a, 3a, 5a, 7a, 7e, 9e).

Figure 9A:
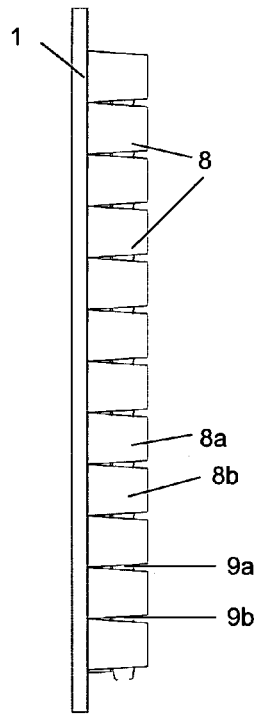
FIG. 9a is a cross section of a slat of a slat system according to the invention which is embodied, in accordance with the vertebral column principle, in an intermediate position.
Figure 9B:
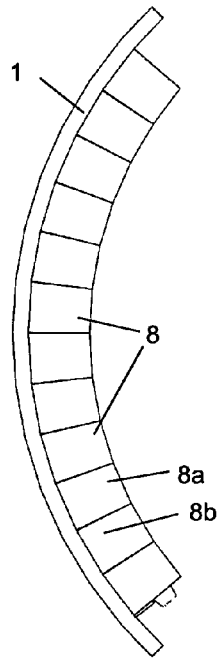
FIG. 9b is a cross section of the slat as shown in FIG. 9a in a bent, rigidified position.
Figure 9C:
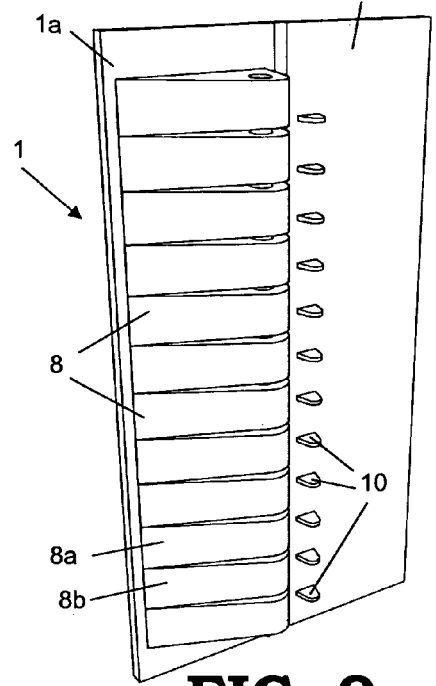
Figure 9D:
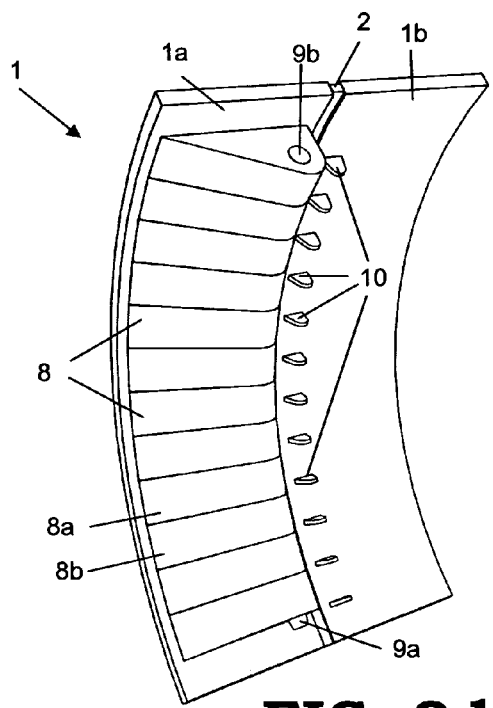
FIG. 9d is a perspective rear view of FIG. 9b.
Figure 9E:
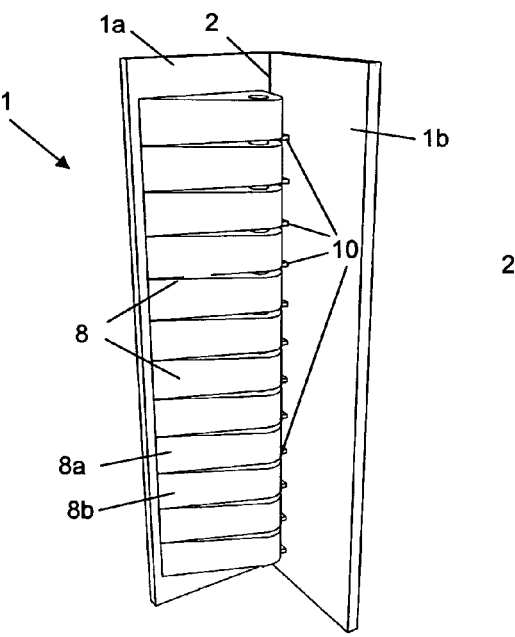
FIG. 9e is a perspective rear view of the slat as shown in FIG. 9a in a rigidified position wherein the slat parts are at an angle of 90° with respect to one another.

If the slats (1) are shaped on the basis of the vertebral column principle, such as is shown in FIGS. 9a to 9e inclusive, a slat (1) of this type can both be rigidified in a position wherein the entire slat (1) is bent (see FIGS. 9b and 9c) and in a position wherein the slat parts (1a, 1b) are located at an angle differing from the straight angle or the zero angle (see FIG. 9e). For this purpose, the slat (1) is provided with vertebral connections in the form of conical pieces (8) which, as a result of bending, come to lie against one another and can be interconnected, for example utilizing the peg-hole principle, the peg (9a) being provided in a first conical piece (8a) and the hole (9b) being provided in an adjacent second conical piece (8b). However, other known principles can also be used for this purpose. In this way, the entire slat (1) can be rigidified in a bent state.

It is furthermore possible to rigidify the slat (1) as a result of the folding toward one another of the slat parts (1a, 1b) until these slat parts (1a, 1b) are located at an angle differing from the straight angle or the zero angle; in FIG. 9e this is an angle of 90°. In this case, one or more nipples (10) made of a flexible material, for example plastics material, can be present on the rear of the slat (1) which can be rotated between the openings between the conical pieces (8, 8a, 8b) in order to obtain sturdy rigidification.

A slat (1) according to the invention can accordingly adopt three positions, namely—a deformed position (see FIGS. 1c, 1d, 2b, 3c, 5b, 7c, 7f, 9b, 9g) wherein the entire slat (1) is bent and/or twisted;

an intermediate position (see FIGS. 1b, 3b, 7b, 7d and 9c) wherein the slat parts (1a, 1b) are located at a straight angle (see FIGS. 1b, 7d and 7e) or a zero angle (see FIG. 3c) with respect to one another;

a rigidified position (see FIGS. 1a, 2a, 3a, 5a, 7a, 7e, 9d and 9e), wherein the entire slat (1) is no longer or substantially no longer deformable.

In the case of slats (1) which make use of the vertebral column principle (see FIGS. 9a to 9e inclusive) as described hereinbefore, two rigidified positions are possible, namely a first rigidified position when the vertebral connections (8, 8a, 8b) of the slat (1) are interconnected in a bent position of the slat (1) (see FIGS. 9b and 9d), and a second rigidified position when the slat parts (1a, 1b) are hinged at an angle differing from the zero angle or the straight angle with respect to one another (see FIG. 9e).

Figure 1B:
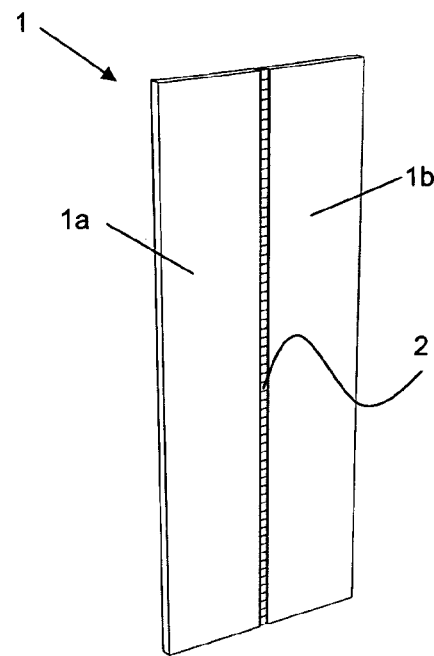
Figure 1C:
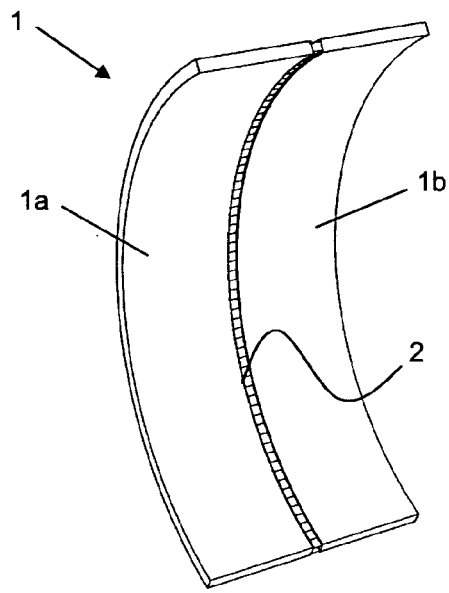
Figure 1D:
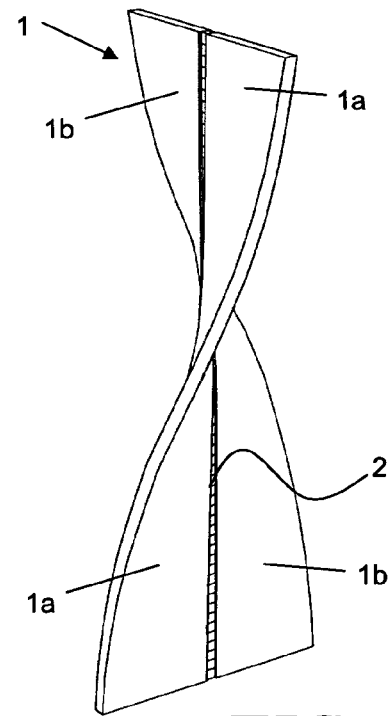

Making use of these positions, the slat (1) can be deformed and rigidified in a large number of different ways. A number of possible examples of this are:

A first possibility, as is shown in FIGS. 1a to 1c inclusive and 7a to 7f inclusive, is that wherein the slat (1) is brought from a rigidified position, wherein the second slat part (1b) is hinged (rotated) at an angle of 90° with respect to the first slat part (1a), in such a way that, if the slat (1) is for example applied against a wall, merely one of the slat parts (1a, 1b) is visible from the front, via an intermediate position, such as is shown in FIG. 1b, wherein the two slat parts (1a, 1b) are located at a straight angle with respect to one another, to a deformed position, wherein the deformed position can be both a bent position (see FIG. 1c) and a twisted position (see FIG. 1d). This has the advantage that it is possible for the second part (1b) (=front part) of the slat (1) to extend as a fixed portion, which forms for example a parapet in a wall, as a result of which for example an attractive tight vertical lineation can be obtained in the wall system.

Figure 3C:
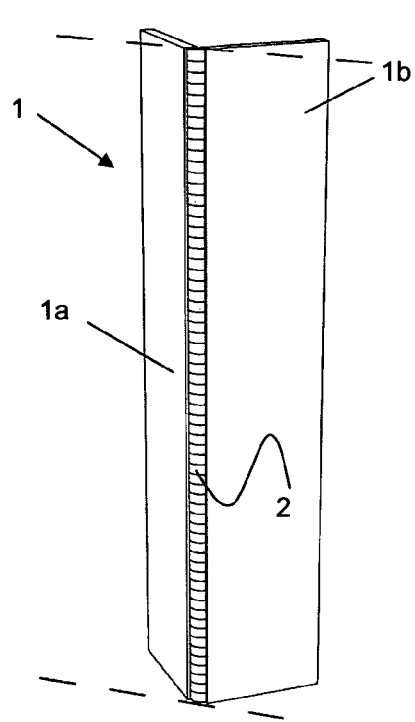
Figure 3C:
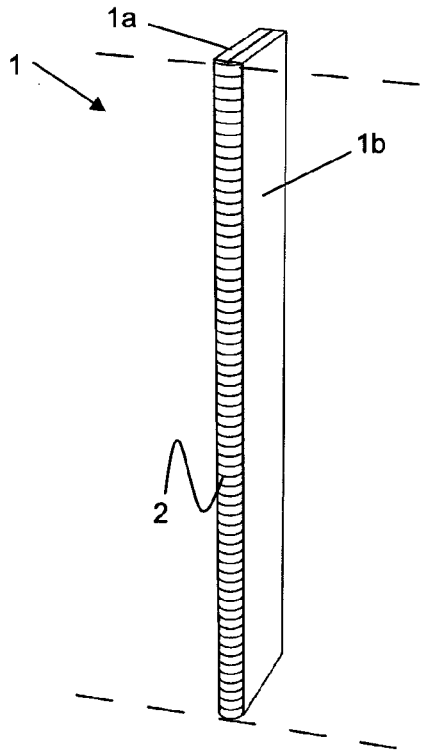
Figure 3C:
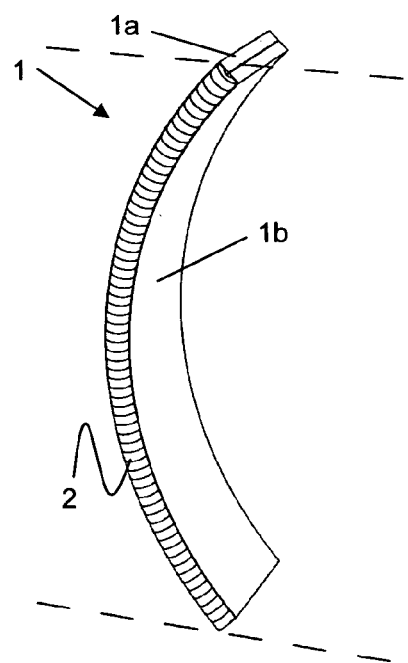

A second possibility, as is shown in FIGS. 3a to 3c inclusive, is that wherein the slat (1) is brought from a rigidified position, wherein the second slat part (1b) is hinged (rotated) at an angle of 90° with respect to the first slat part (1a), in such a way that, if the slat (1) is for example applied against a wall, merely one of the slat parts (1a, 1b) is visible from the front, via an intermediate position, such as is shown in FIG. 3b, wherein the two slat parts (1a, 1b) are located at a zero angle with respect to one another (or in other words the slat (1) is completely folded up), to a deformed position, wherein the deformed position can be both a bent position (see FIG. 3c) and a twisted position (not shown in the figures). In this case, the hinge line (2) between both slat parts (1a, 1b) should however be able to resist the sliding of the two slat parts (1a, 1b) over one another which is produced during the bending of the 2 slat parts (1a, 1b) at a different radius of curvature.

Figure 2A:
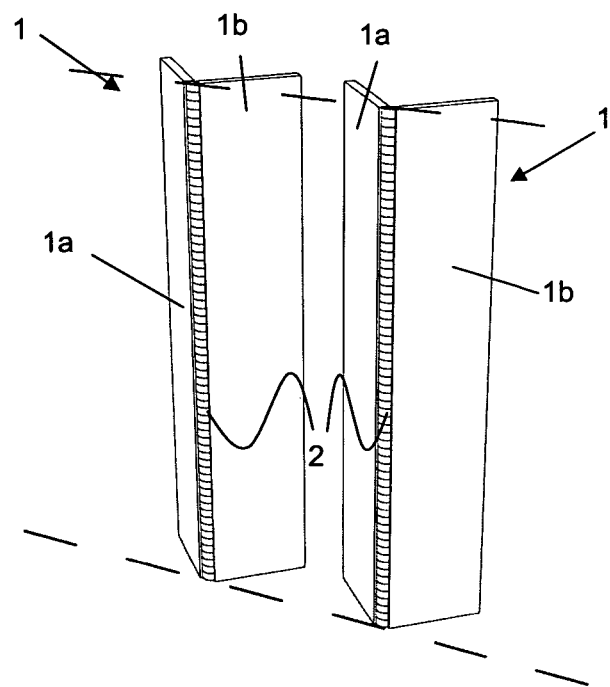
FIGS. 2a and 2b are a perspective view of a second possibility of a rigidified and a deformed position of two slats of a slat system according to the invention.
Figure 2B:
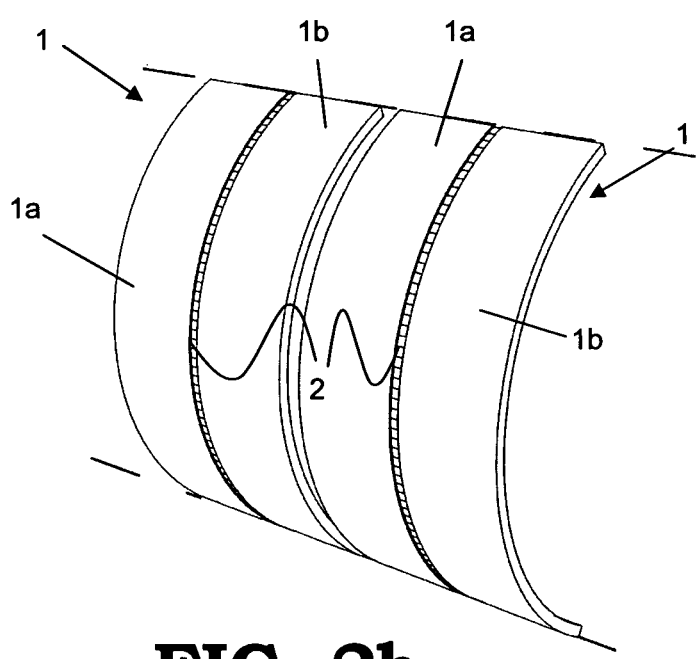

A third possibility, as is shown in FIGS. 2a and 2b, is that wherein the slat (1) is brought from a rigidified position, wherein the second slat part (1b) is hinged (rotated) at an angle of 45° with respect to the first slat part (1a), in such a way that, if the slat (1) is for example applied against a wall, it is L-shaped viewed from the front, as is shown in FIG. 2a, via an intermediate position (not shown in the figures), to a deformed position, wherein the deformed position can be both a bent position (see FIG. 1c) and a twisted position (not shown in the figures). It will be clear that this intermediate position can be both a position wherein the slat parts (1a, 1b) are located at a straight angle with respect to one another (in accordance with FIG. 1b), and a position wherein the slat parts (1a, 1b) are located at a zero angle with respect to one another (in accordance with FIG. 3c).

There are however also a number of other possibilities.

With regard to FIGS. 1a to 3c inclusive, 5a and 5b, and 7a to 7f inclusive and 9a to 9e inclusive (which are merely schematic drawings), the following should be noted:

the slats (1) in these figures are arranged vertically. It is however obvious that these slats (1) can also be arranged in any other direction. If a slat (1) of this type is arranged in a horizontal direction, and if a first slat part (1a or 1b) is secured at both ends at the level at which the slat parts (1a, 1b) hinge with respect to one another, and the other slat part (1b or 1a respectively) extends downward at an angle of for example 90° with respect to the first slat part (1a or 1b), this first slat part (1a or 1b) can hold the entire slat (1) in a rigidified position by way of gravity alone. An external force wherein the other slat part (1b or 1a respectively) is brought to a straight angle with respect to the first slat part (1a or 1b), in such a way that the entire slat (1) extends in a substantially horizontal plane, will ensure that the entire slat (1) will, as a result of gravity, deform flexibly in the form of a bending;

the slats (1) can assume any form and do not in all cases have to be identical in shape. It is thus possible to obtain complex patterns within which the slats fit into one another like pieces of a puzzle;

the slats (1) can also be constructed from more than two slat parts (1a, 1b) which are joined together by means of a line (2) and are arranged hingeably with respect to one another around this line (2).

The bending, twisting and rigidifying of the slats (1) is in this case carried out by an external force which is exerted on the slats (1).

This external force can be exerted by means of actuators. These actuators can inter alia be selected from thermal actuators, pneumatic actuators, hydraulic actuators, three-dimensional actuators, electric motors, stepping motors, piezoelectric translators or linear actuators. However, other types of actuators can also be used. These are preferably activated by the necessary software. If the slat system according to the invention is used in relatively large entities such as buildings, the external force can also be exerted by means of inter alia steel cables and other strengthening and transfer components activated by relatively large hydraulic systems.

As may be seen in FIG. 4a, the slat parts (1a, 1b) can be hingeably joined together by means of a connecting element (3) with which the slat parts (1a, 1b) are joined together at least partly via a line (2). The hinge (2) can in this case consist of hinges, fibers, a fabric or a composite of fabric in combination with a very resilient synthetic polymer. As may be seen in FIG. 4b, it is however also possible for the slat parts (1a, 1b) to be hingeable with respect to one another by means of a flexible constriction between the two slat parts (1a, 1b) which is integrally provided in the material from which the slat (1) is made.

An elastically deformable slat (1) from a slat system according to the invention should be made from materials having adequate mechanical, electrical, optical, thermal, chemical and fire-related properties selected as a function of the presupposed objectives. Preferably, a slat (1) of this type is made of an elastically deformable polymer material, an elastically deformable composite, an elastically deformable metal or a combination of an elastically deformable composite and elastically deformable metal. The word "composite" is used here in its broadest sense; in other words, the composed entity of various materials can also contain materials—such as inter alia metals and glass—other than those from the natural and synthetic polymers. Thus, if synthetic polymers are used, resilience will be important. The orientation of the bonds of the polymers must be selected in a purposeful manner. The orientation and the type of fibers and/or fabric to be added to the matrix will also be selected in the case of a composite. The elastic deformation in the form of a bending and/or a twisting of the slat (1) is after all of primary importance and once the slat parts (1a, 1b) have been hinged with respect to one another at an angle differing from a straight angle or a zero angle, and are thus in the rigidified position or, in the case of a slat (1) which makes use of the vertebral column principle, in a bent, rigidified position, the slats (1) must form a stiff (rigidified) entity.

An elastically deformable slat (1), which consists of a core made of composite material, for example a polymer, can be provided on the outside of the slat parts (1a, 1b) with a thin metal lining (4) (for example aluminum), such as is shown in FIGS. 4a and 4b. The polymer can in this case be mixed with strengthening fibers, or be provided with a strengthening net (A) as reinforcement. This strengthening net can in this case, as shown in FIG. 4a, be attached to the outside of the slat (1) and thus serve as a hinge (2). This strengthening net (A) can however also be attached in the core of the slat parts (1a, 1b) (see the broken line in FIG. 4a). If the slat parts (1a, 1b) are hingeably joined together by means of a flexible constriction which is integrally provided in the material from which the slat (1) is made, and this strengthening net (A) is located in the neutral zone (=zone where neither pulling nor pushing forces are exerted), this strengthening net also serves as the hinge (2) (as is shown in FIG. 4b).

Both the front (5) and the back (6) of the slats (1) can be profiled as desired. When slats (1) are bent, there invariably occurs in this case a compression of the material from which the slats (1) are made, at the concave side thereof. The excess material can be removed via incisions of any type and shape. The pull which is produced in the material at the convex side can be limited via incisions.

Furthermore, recesses, profilings and/or internal channels (17) can also be provided in order:

to limit the weight and the amount of material to be used, to gain strength in a specific form or along a specific axis, to allow dilatation or deformation or to be able to fix attributes so that expansion is after all possible during, for example, curving;

to obtain a specific rain- or wind-tight entity (for aerodynamic reasons);

to obtain a specific aesthetic character or else to cause the slats to adjoin one another in their shape;

to fill the slat parts (1a, 1b) with liquids, media, PCMs (phase change materials) or rigidifiable composites;

if internal channels (17) and/or recesses are provided, providing cables, lines (for example LED lighting lines) and/or reinforcement parts (for example reinforcement bars) which can if appropriate be slid into and out of these internal channels (17) and/or recesses. These can in turn be slid, if appropriate via actuators, into and out of these internal channels (17) and/or recesses when necessary. This allows specific slats (1) to be additionally strengthened or rigidified where necessary.

Figure 6A:
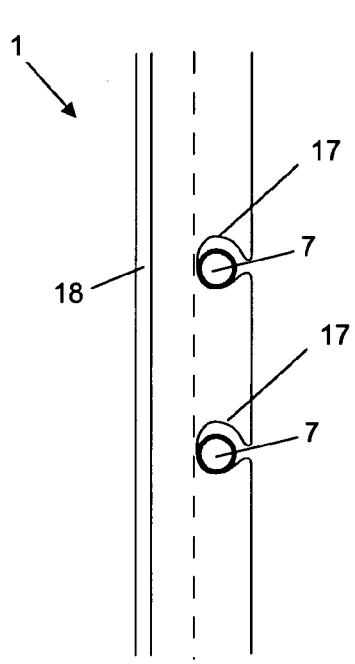
FIGS. 6a and 6b are a cross section of a rigidified and deformed position of an embodiment of a slat of a slat system according to the invention which is provided with photovoltaic solar cells and heat collector pipes.
Figure 6B:
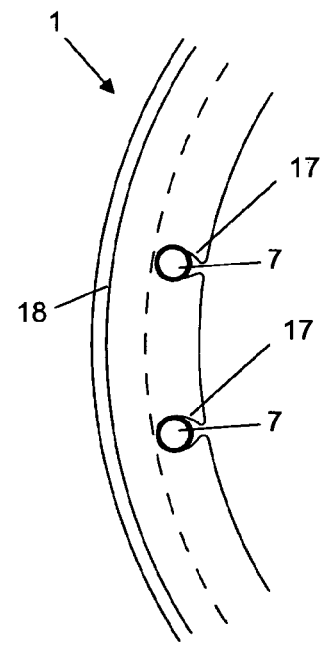
Figure 7A:
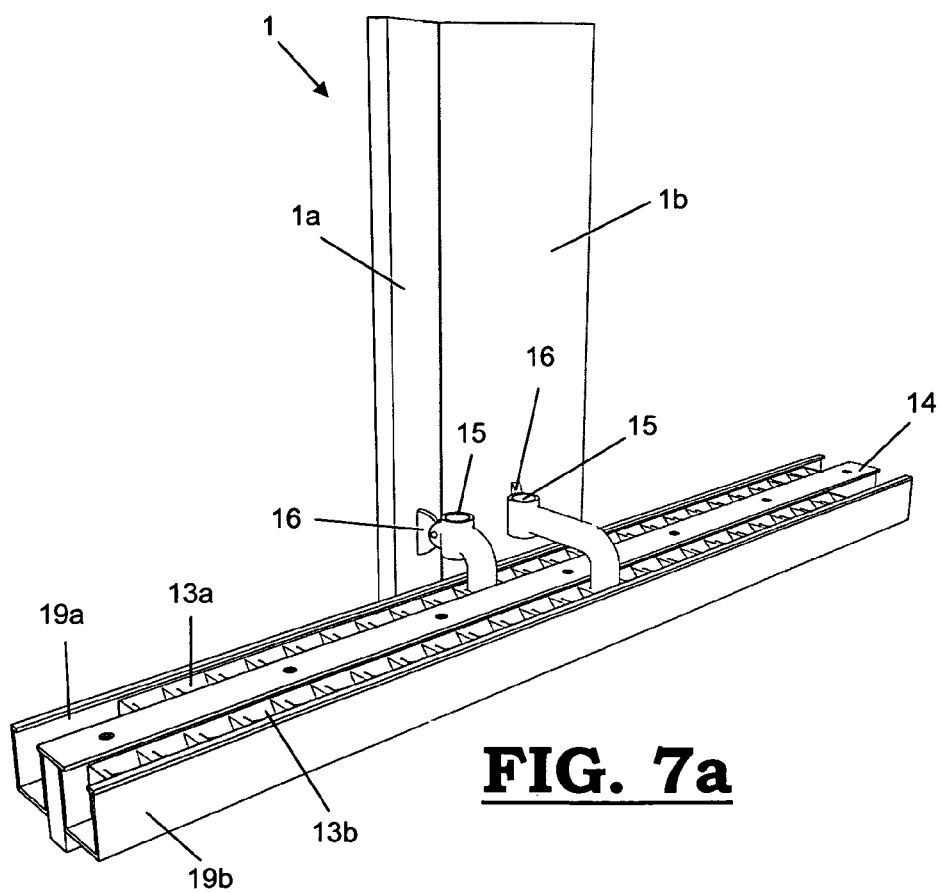
FIGS. 7a to 7c inclusive are a perspective rear view of a first example of application of a slat of a slat system according to the invention in a rigidified position, an intermediate position and a deformed position.
Figure 7B:
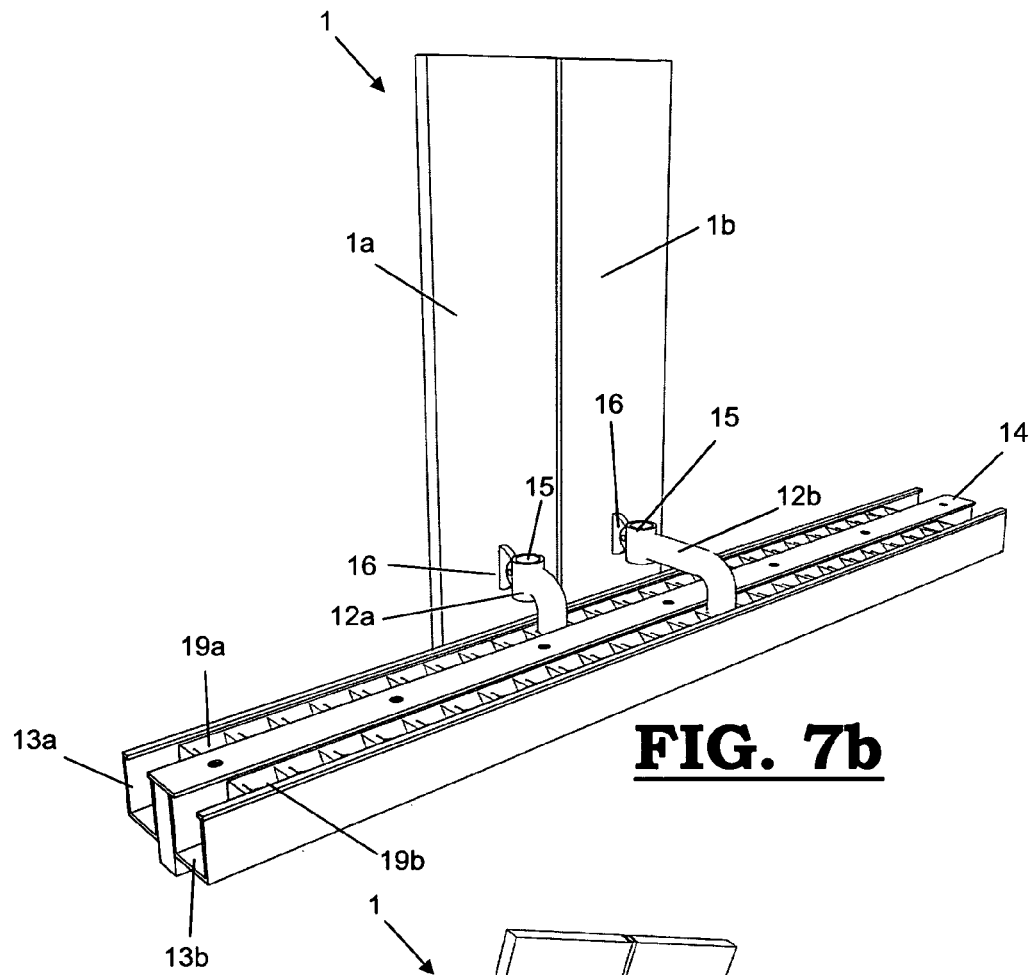
Figure 7C:
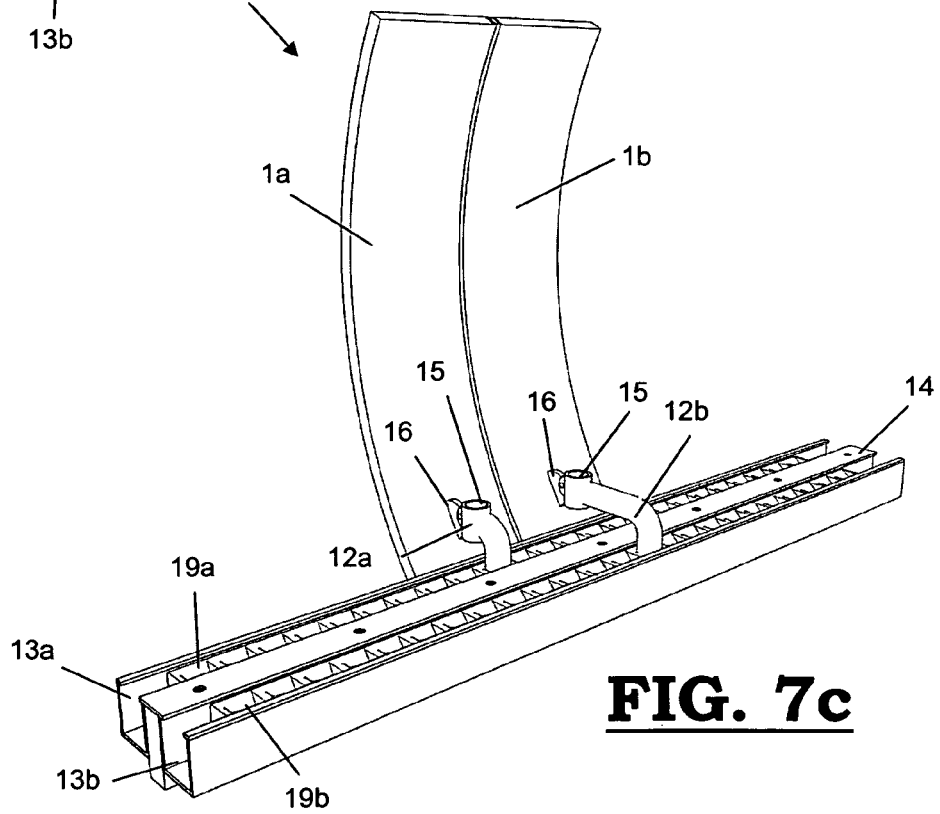
Figure 7D:
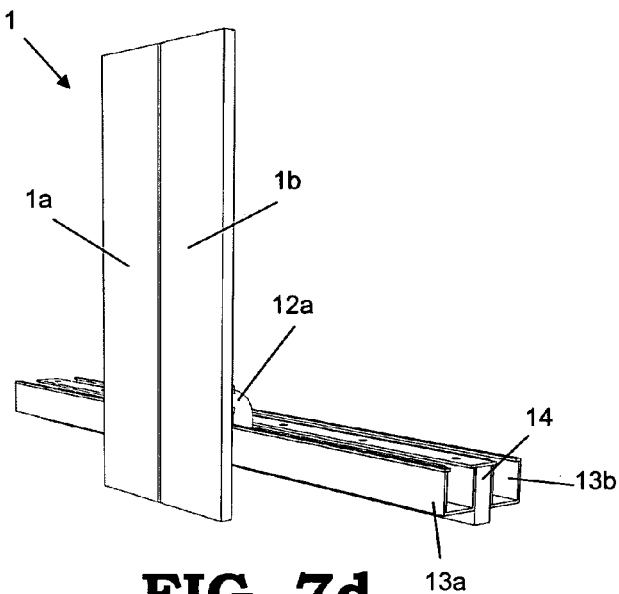
FIGS. 7d to 7f inclusive are a perspective front view of the example of application of a slat of a slat system according to the invention in the intermediate position, the rigidified position and the deformed position as shown in FIGS. 7a to 7c inclusive.
Figure 7E:
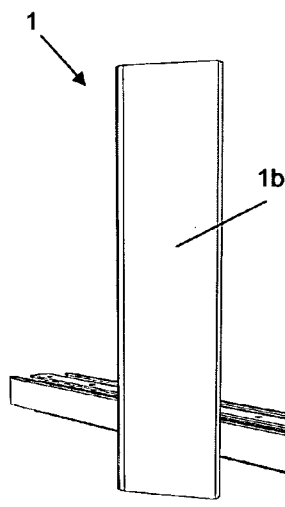
Figure 7F:
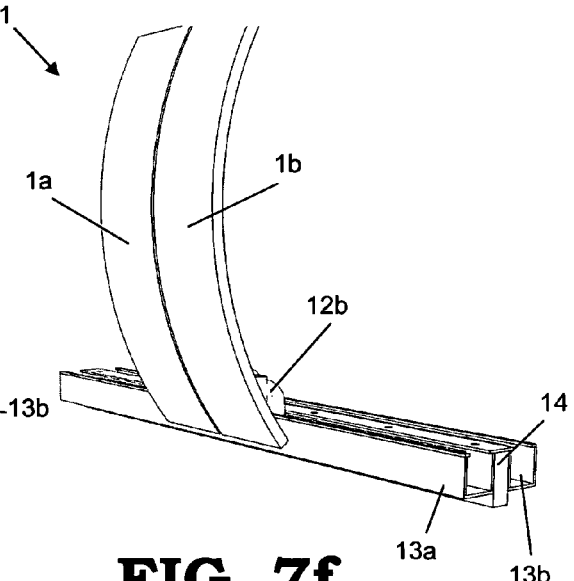
Figure 8C:
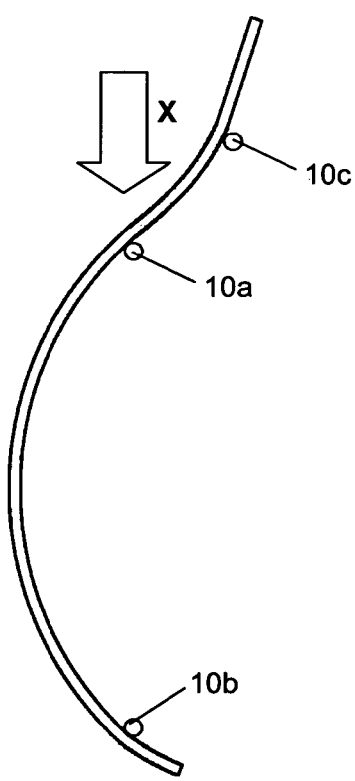
FIG. 8c is a cross section of the slat as shown in FIG. 8a in a bent position wherein a third manipulable point is provided.
Figure 8D:
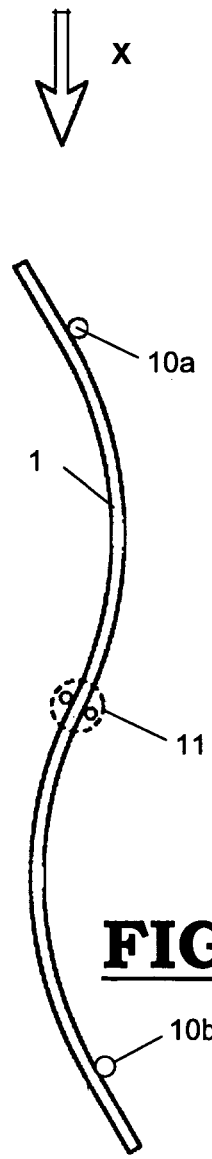
FIG. 8d is a cross section of the slat as shown in FIG. 8a in a bent position wherein a third point is provided in the form of a point of rotation.

A slat system according to the invention can also be provided with energy collection possibilities, both for external applications, such as sun-protecting awnings, and for internal applications. As is shown in FIGS. 6a and 6b, the slats (1) can be provided on their front with flexible photovoltaic solar cells (=flexible solar panels) (18) (as for example described in GB 2428331) which can be bound to the outside of the slats (1) (as shown in FIGS. 6a and 6b). These photovoltaic solar cells (18) can be attached precisely at these locations where they can perform best when the slats (1) are deformed. The photovoltaic solar cells (18) are positioned at some distance from one another and fastened to a flexible polymer substrate. The photovoltaic solar cells (18) can, via the deforming of the slats (1), be directed toward the sun. During the bending of the slats (1), or thus the opening of the sun protection, both the photovoltaic solar cells (18) and the heat collector pipes (7) will be directed toward the sun.

Furthermore, the slats (1) can also be provided with continuous heat collector pipes (7) which are attached in internal channels (17) in the slats (1). A liquid flows in these heat collector pipes (7). As may be seen in FIG. 6b, these heat collector pipes (7) are completely fixed in this closed position, thus allowing optimum emission of heat to the pipe and intermediate liquid. In this way, the heat can be withdrawn from the slats (1) themselves, so that the photovoltaic solar cells (18) can ensure a maximum output.

In this way, the slat system according to the invention also allows the amount of visible light and the infrared radiation or heat radiation to be manipulated and at the same time even, if desired, the energy to be collected and converted into other forms of energy.

In order to prevent overheating of the intermediate liquid in the heat collector pipes (7), the slats (1) can be brought from the closed position (as shown in FIG. 6b) back to the open position (as shown in FIG. 6a), as a result of which the exposure to the sun becomes less efficient and the heat collector pipes (7) become partly free again, thus also allowing cooling of the temperature of the intermediate liquid.

It goes without saying that the composition and the material properties of the flexible slats (1) can be specifically developed in these applications. Where necessary, the synthetic polymers can be more or less conductive of heat.

If the slats (1), as shown in FIGS. 5a and 5b, and as already described hereinbefore, are provided with a third slat part (1c) which is securely connected to the first slat part (1a), and which can be permanently rigidified or permanently deformed, the most complex forms can be obtained. Slats (1) of this type have the advantage that they can merge with other surfaces such as for example roof surfaces. It is also possible to have a specific portion of the slats (1) overhang as awning or to have it deform in a specific direction via actuators and any transfer constructions or to raise it. As a result of the fact that it is possible in this way to make a transition from rectilinear surfaces to bent surfaces, the shadows can, as a function of the manner in which the slat is arranged, in one case be very taut, sharp and rectilinear, and in the other case have much softer and rounder effects.

Various slats (1) can be placed next to one another both rectilinearly and circularly. The slats (1) may or may not in this case be mutually connected. The circular placing of slats next to one another produces between the slats openings which, in a deformed position, become larger if the slats (1) are bent outward, or smaller if the slats (1) are bent inward. This does require a sufficient gap between two slats (1) which are located next to one another, in order to prevent collision with one another. However, in order to address this problem, allowance may already be made, in the shape of the slats (1), for the deformation curve thereof. In this way, it is for example possible to provide a combination of deformation of a first series of slats (1) outward and deformation of a second series of slats (1), which extends between the first series of slats (1), inward.

One or more slats (1) can be provided on the outer surface thereof with prints.

Furthermore, a relief, texture, etc. can also be attached. It is also possible to attach light foils and/or flexible data screens to one or more slats (1) so that advertising or other information can be conveyed.

Furthermore, it is also possible to place around one or more slats (1) a casing which encases the slats (1) as a sleeve so that a different shaping effect is obtained, since the slat parts (1a, 1b) are no longer visible. This encasing can be made, at the side edges thereof, of a soft plastics material so that the slats (1) become for example finger-safe.

Furthermore, it is possible to select to hold at a fixed location one or both ends of one or more slats (1) at the level of the location where the slat parts (1a, 1b) hinge with respect to one another, for example by connecting them to one or more slats (19a, 19b) which are slidably arranged in guide rails (13a, 13b) (see FIGS. 7a to 7f inclusive—this is described further in Application Example 1). If a vertically arranged slat (1) is held at a fixed location at one of these ends, and not at the other of these ends, then this vertically arranged slat (1) will bend in its deformed position, owing to the flexibility thereof, and lean over under the influence of gravity. However, in this way, the slat (1) is not twistable (if the slat parts (1a, 1b) are located at a straight angle or a zero angle with respect to one another). If, however, a slat (1) is held at both these ends at a fixed location, then a slat (1) of this type is, irrespective of the direction wherein it is arranged, both twistable and bendable.

As is shown in FIGS. 8a to 8d inclusive, the bending of the slats (1) can also be carried out by way of two or more hinge points (10a, 10b) and optional floating points (10c, 11). The provision of points (10a, 10b, 10c, 11) of this type can in this case have an important influence on the elastic deformation of the slat (1), as a result of which these can assume various bending curves, as may clearly be seen from FIGS. 8a to 8d inclusive, namely: if now, for example, a slat (1), which is arranged with respect to two hinge points (10a, 10b), is bent from the intermediate position (see FIG. 8a) to the deformed position by way of these two hinge points (10a, 10b) (see FIG. 8b), by exerting an external pushing force (X) on the hinge point (10a), this slat (1) will undergo a different deformation from when a third, optionally manipulable floating point (10c) is present, as may be seen in FIG. 8c. In addition, this slat (1) will undergo still another deformation when a third point in the form of an intermediate point of rotation (=double floating point) (11) is present (see FIG. 8d). A point of rotation (11) of this type will halve the bending length of the slat (1), as a result of which the slat (1) will, under the bending pressure, instead of forming one more arc, form a concave arc and a convex arc.

The slat system according to the invention can inter alia be used in:
    walls, ceilings and floors. If these are used in facades, this slat system can also function as a support and sun protection. If it is used as sun protection, the sun protection can in the morning be slid upward and brought to the deformed position and in the evening or in stormy weather be closed again, or be brought to the rigidified position. In this case, additional interlocking systems can be provided;
    overhanging systems such as garden installation elements, parasols and awnings;

park and garden environments, for example as a garden pavilion which can cast a shadow or make an entity wind-tight.

APPLICATION EXAMPLES

Application Example 1

Application as Vertical Facade Slats (See FIGS. 7a to 7f Inclusive)

Each of the slat parts (1a, 1b) of an elastically deformable slat (1) of a slat system according to the invention, which is intended to function as a vertical facade slat, are at the non-visible side looking toward the building which is provided with a shaft (12a, 12b) which is arranged so as to be movable with respect to this slat part (1a, 1b).

Each shaft (12a, 12b) can in this case be connected to a respective slat part (1a, 1b) by means of two interconnected hinges (15, 16), which can rotate at right angles to one another, for each slat part (1a, 1b), namely a first hinge (15) for the hinging of the slat parts (1a, 1b) with respect to one another, and a second hinge (16), for the bending of the entire slat (1). Each shaft (12a, 12b) is fastened to a respective slat (19a, 19b) which can slide back and forth in a guide rail (13a, 13b) and which ensures the hinging of the slat parts (1a, 1b) with respect to one another. These guide rails (13a, 13b) form part of the main slat (14), this entity being arranged so as to be able to move up and down, thus ensuring the bending of the entire slat (1).

It is however also possible to connect each shaft (12a, 12b) to a respective slat part (1a, 1b) by means of merely one rotatable hinge (15) for each slat part (1a, 1b), in such a way that the slat parts (1a, 1b) are hingeable with respect to one another and the entire slat (1) is bendable, but with a different bending curve to that obtained when, as described hereinbefore, two hinges (15, 16) are provided.

Application Example 2

Figure 10A:
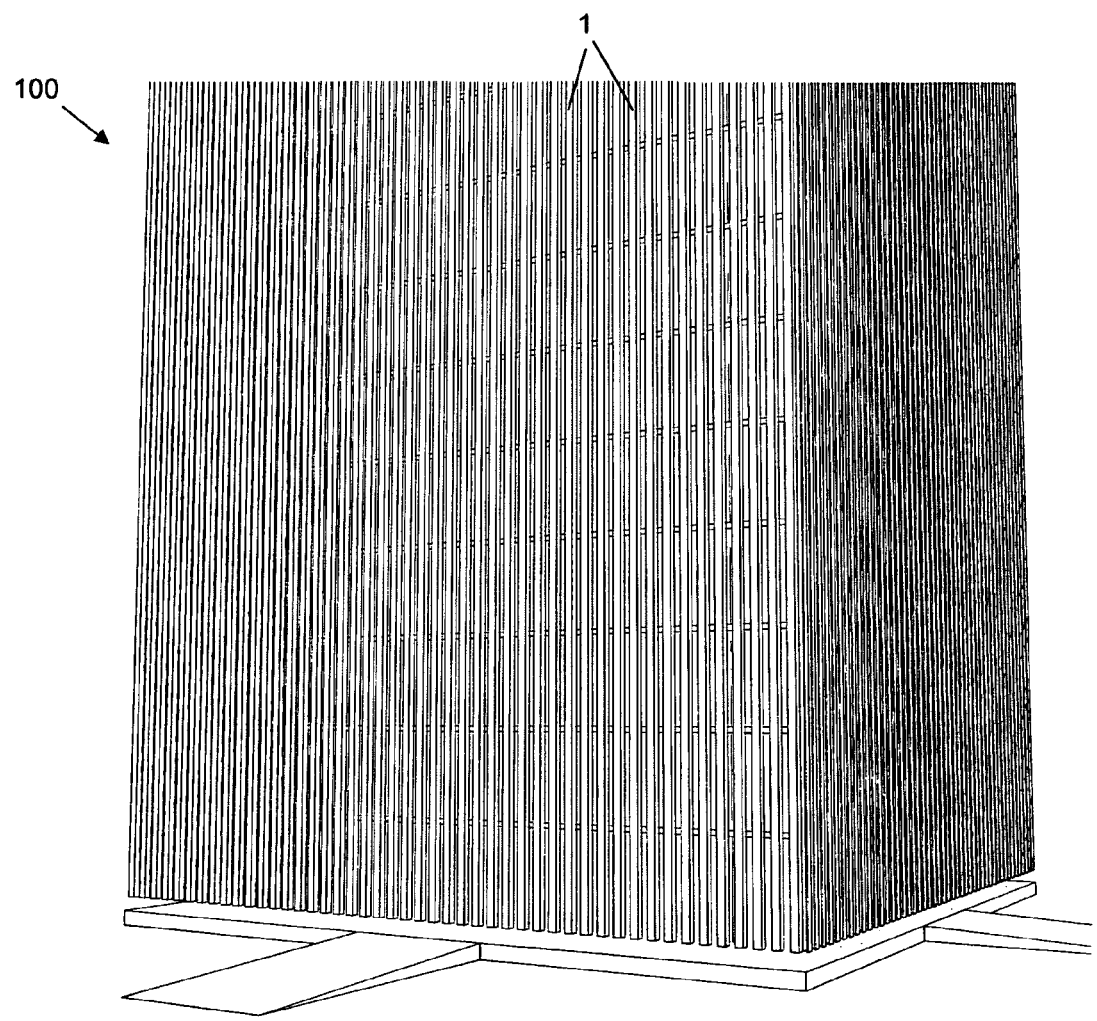
FIG. 10a is a perspective front view of a building provided with a slat system according to the invention, the slats being in the rigidified position.
Figure 10B:
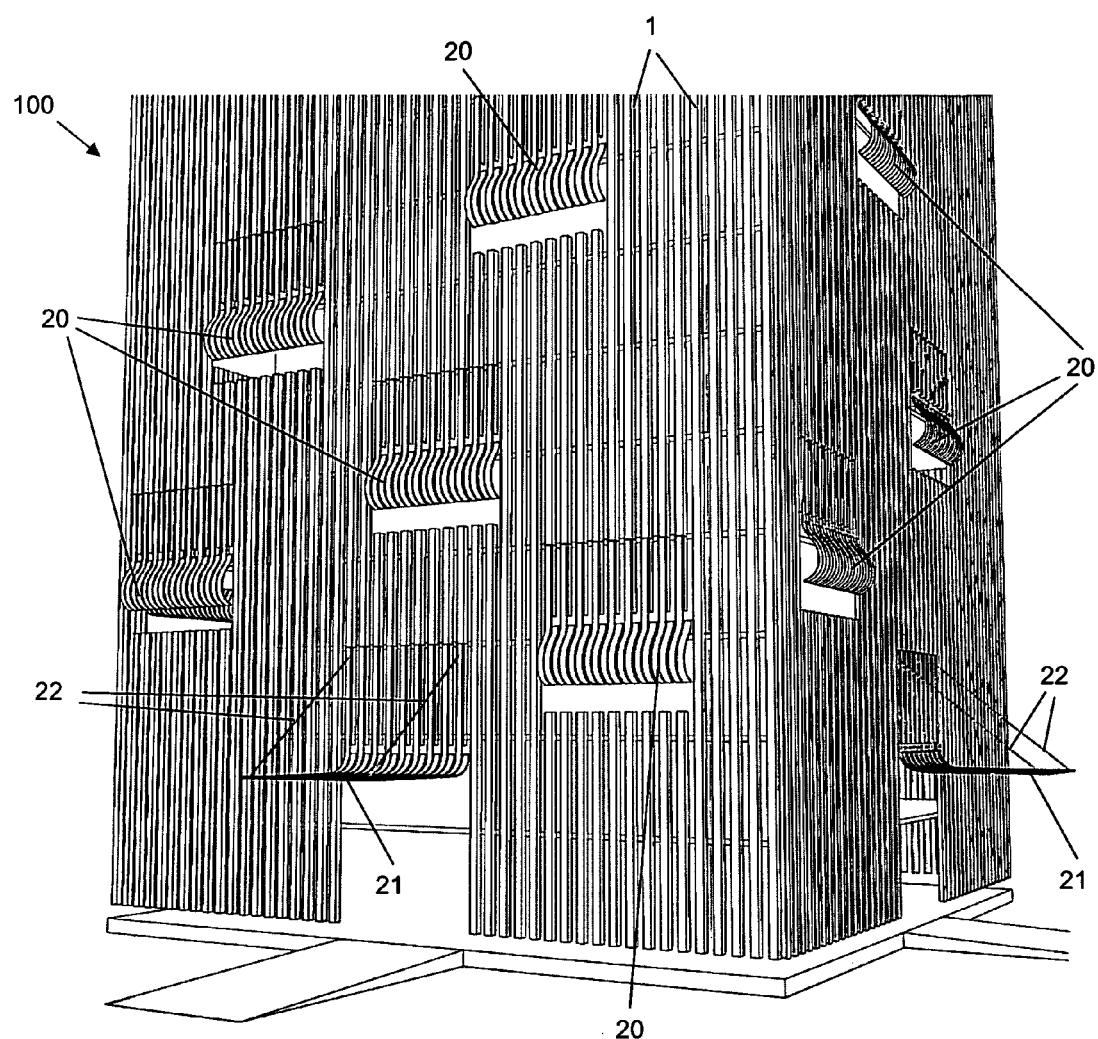
FIG. 10b is a perspective front view of the building as shown in FIG. 10a, wherein a plurality of slats are in the deformed position.

Application in a Building (See FIGS. 10a and 10b)

As is shown in FIG. 10a, a building (100) can be encased by a slat system according to the invention, which forms a flexible skin around the building. In this case, the slats (1) are arranged rectilinearly. The slats (1) are in this case in a rigidified position. As is shown in FIG. 10b, at specific locations in the building, the slats can be brought to a deformed position, in this case a bent position. In this figure, the bent slats (1) form both a sun protection (20) for windows and an awning (21) for door openings. In the sun protection (20), the slats (1) are bent partly outward and, in the awnings (21), the slats (1) are folded outward and upward by means of steel cables (22) and a metal intermediate piece which join adjacent slats (1) together.

Application Example 3

Figure 11:
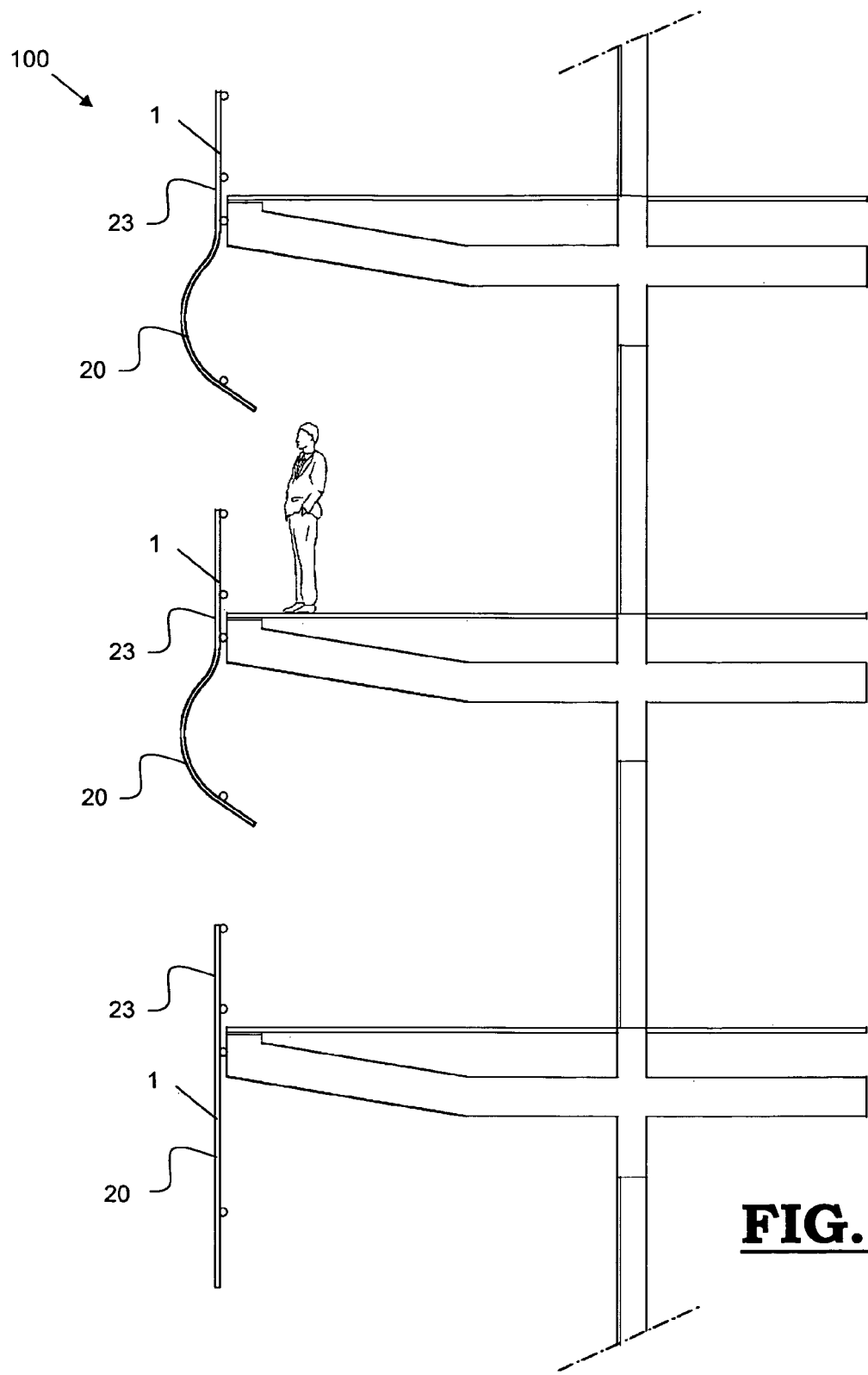
FIG. 11 is a cross section of a portion of a building with a slat system according to the invention which serves as sun protection and a parapet.

Application as Sun Protection and a Parapet (See FIG. 11)

As is shown in FIG. 11, a slat (1) of a slat system according to the invention can be used in a building (100) both as sun protection (20) and as a parapet (23), both in the deformed (in this case bent) position and in the rigidified position.

The invention claimed is:

1. A deformable slat system for a building construction, comprising
a deformable slat comprising two slat parts which are joined together in such a way that they are hingeable about a hinge line, wherein the deformable slat is bendable and/or twistable in a first position in which the slat parts are hinged at a straight angle or a zero angle with respect to one another and is rigidified in a second position in which the slat parts are hinged at an angle differing from the straight angle or zero angle with respect to one another; and
an element configured to bring the deformable slat, while it is in operational position on a structure, selectively into the first and the second position, and to bring the deformable slat, which has been brought into the first position, into a bent and/or twisted position.

2. The deformable slat system for a building construction, as claimed in claim 1, characterized in that the element comprises a displacement mechanism which is provided to bring the deformable slat, selectively, to the first or the second position and to bring the deformable slat, which has been brought into a first position, selectively, into the desired bent and/or twisted position.

3. The deformable slat system for a building construction as claimed in claim 2, characterized in that the displacement mechanism comprise at least one actuator to bring the deformable slat automatically into a rigidified or a bent or a twisted position.

4. The deformable slat system for a building construction as claimed in claim 1, characterized in that the two slat parts are hingeably joined together at one side over their entire length.

5. The deformable slat system for a building construction as claimed in claim 1, characterized in that the slat parts comprise a first slat part and a second slat part, wherein the first slat part is hingeably connected to the second slat part only over a portion of its length.

6. The deformable slat system for a building construction as claimed in claim 5, characterized in that the first slat part is connected over another portion of its length to a third slat part and in that the first and the third slat part are connected in a fixed position with respect to one another and form a permanently rigidified and/or deformed portion of the deformable slat.

7. The deformable slat system for a building construction as claimed in claim 1, characterized in that the deformable slat is constructed on the basis of the vertebral column principle and can be rigidified in a bent position.

8. The deformable slat system for a building construction as claimed in claim 7, characterized in that one of the slat parts is provided on one side with a number of conical pieces of which at least two neighboring pieces are provided with means for being joined together in a bent position of the one slat part, so that the deformable slat is rigidified in this bent position.

9. The deformable slat system for a building construction as claimed in claim 8, characterized in that another of the slat parts is provided on the one side with one or more nipples made of a deformable material, which are located in a respective space between two neighboring conical pieces when the slat parts are placed in an angle-forming position.

10. The deformable slat system for a building construction as claimed in claim 1, characterized in that the deformable slat is provided with recesses, profilings and/or internal channels.

11. The deformable slat system for a building construction as claimed in claim 10, characterized in that the recesses, profilings and/or internal channels are provided with reinforcement parts, PCMs, rigidifiable composites, heat collector pipes, cables and/or pipes.

12. The deformable slat system for a building construction as claimed in claim 1, characterized in that the deformable slat is provided with one or more flexible photovoltaic solar cells, light foils and/or flexible data screens.

13. The deformable slat system for a building construction as claimed in claim 1, characterized in that the deformable slat is provided on an outer surface with texture, patterns and/or prints.

14. The deformable slat system for a building construction as claimed in claim 1, characterized in that the deformable slat is held at one or both ends in the slat system.

15. The deformable slat system for a building construction as claimed in claim 14, characterized in that the deformable slat is held in the slat system as a result of the fact that each of the slat parts is connected to a respective slidable slat, so that the deformable slat can be brought selectively into the first or the second position as a result of the sliding of the slidable slats.

16. The deformable slat system for a building construction as claimed in claim 15, characterized in that the slideable slats are displaceable in the longitudinal direction of the deformable slat in order to bring the deformable slat into a bent position.

17. The deformable slat system for a building construction as claimed in claim 1, characterized in that one or more floating points are provided in interaction with the deformable slat to influence the bending curve during the bending of the deformable slat.

18. The deformable slat system for a building construction as claimed in claim 1, characterized in that the deformable slat is made of at least one of an elastically deformable polymer material, an elastically deformable composite, an elastically deformable metal and a combination of an elastically deformable composite and elastically deformable metal.

19. A building construction comprising a deformable slat system as claimed in claim 1.

* * * * *